Oct. 15, 1946.        N. S. FOCHT        2,409,349
HYDRAULIC SHOCK ABSORBER
Filed Oct. 22, 1945
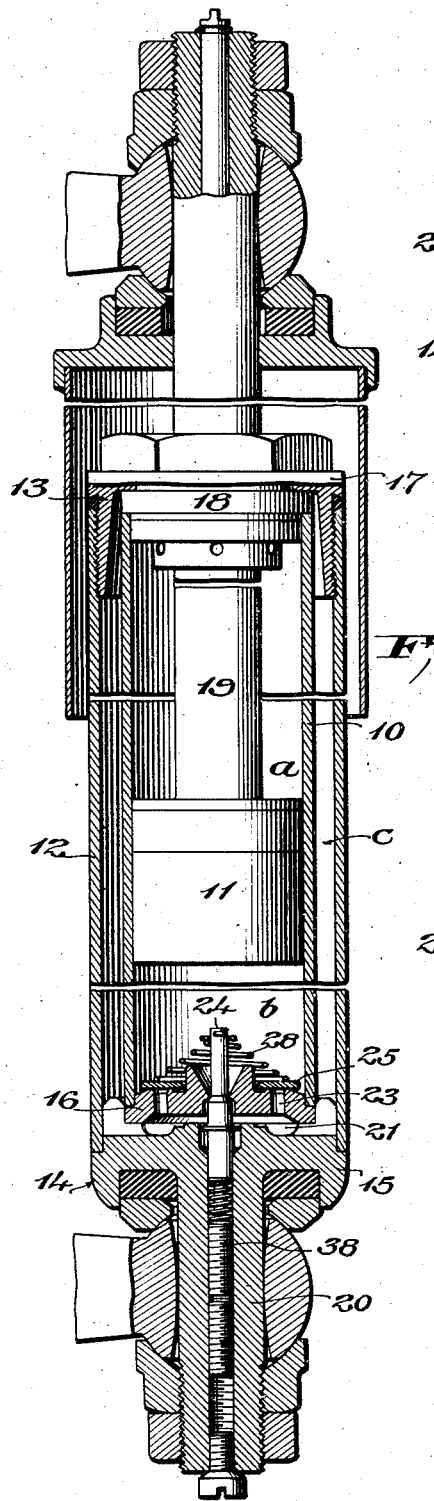
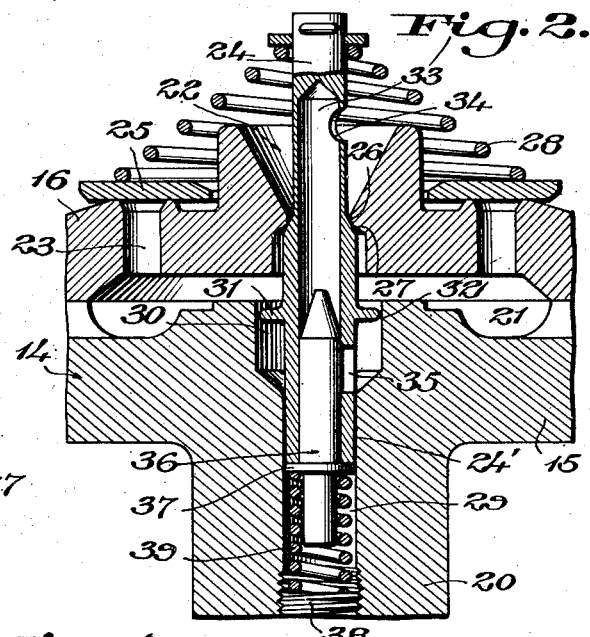
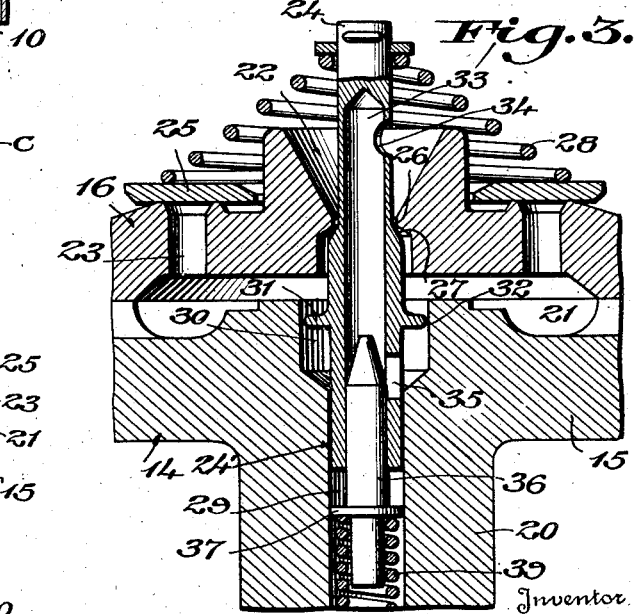
Inventor
Nevin S. Focht,
By
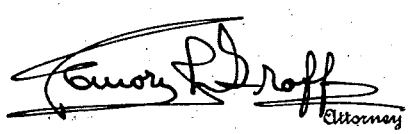
Attorney Patented Oct. 15, 1946

2,409,349

UNITED STATES PATENT OFFICE 2,409,349

HYDRAULIC SHOCK ABSORBER

Nevin S. Focht, Syracuse, N. Y.

Application October 22, 1945, Serial No. 623,762

6 Claims. (Cl. 188—88)

This invention relates to shock absorbers, and has particular reference to improvements in hydraulic shock absorbers of the cylinder and piston, or strut type as disclosed, for example, in my prior U. S. Patent No. 2,342,729 of February 29, 1944, and in my copending application, Serial No. 575,881.

A shock absorber of the type disclosed in my said prior patent and application, includes a valve which is operable, under compression loads imposed upon the shock absorber, to regulate flow of liquid from the cylinder to a reservoir and thus regulate movement of the piston in the cylinder, thereby to cause the shock absorber smoothly to resist and absorb such loads.

The present invention relates more particularly to improvements in such valves and has for its object, generally speaking, to provide a compression control valve which does not lock under peak compression loads imposed upon the shock absorber and which operates to cause the shock absorber to resist and absorb all compression loads in a characteristic, smooth manner, regardless of their severity and the speed of action of the shock absorber.

With the foregoing and other objects in view, which will become more fully apparent as the nature of the invention is better understood, the same consists in a shock absorber compression control valve embodying the novel features of construction, combination and arrangement of parts, and the novel mode of operation, as will be hereinafter more fully described, illustrated in the accompanying drawing and defined in the appended claims.

In the accompanying drawing, wherein like characters of reference denote corresponding parts in the different views:

Fig. 1 is a central, longitudinal section through a shock absorber including a compression control valve constructed and arranged in accordance with one practical embodiment of the invention.

Fig. 2 is a central, longitudinal section on an enlarged scale through the compression control valve showing the same in its normal, closed position; and Fig. 3 is a view similar to Fig. 2 showing the valve in an open position.

Referring to the drawing in detail, it will be observed that the present shock absorber is of the cylinder and piston or strut type shown and described in my aforesaid patent and application and includes a cylinder 10 and a piston 11 for connection with any desired pair of relatively movable elements such, for example, as the axle and the chassis of a motor vehicle.

Concentric with and surrounding the cylinder 10 in spaced relationship thereto is a tube 12, while closing the ends of said cylinder and said tube are heads designated generally as 13 and 14, respectively. These heads may be of any suitable construction and may be mounted in closing relationship to the ends of said cylinder and said tube in any suitable manner. For example, the head 14 may comprise a main body element 15 welded, threaded or otherwise suitably fastened to the related end of the tube 12, and a separate valve seat element 16 superimposed upon said main body element and having the related end of the cylinder 10 seated thereon. Likewise, the head 13 may comprise a main body element 17 welded, threaded or otherwise suitably fastened to the related end of the tube 12, and a separate plug element 18 interposed between said main body element 17 and the related end of the cylinder 10. A piston rod 19 extends from the piston 11 through the head 13 and affords a means of connecting said piston with one of the pair of relatively movable elements to be controlled. On the other hand, a stem 20 extends from the head 14 and affords a means of connecting the cylinder 10 with the other of the relatively movable elements to be controlled. The piston 11 divides the cylinder 10 into recoil and compression pressure chambers $a$ and $b$, respectively, the former of which is between said piston and the head 13 and the latter of which is between said piston and the head 14, while the space between the cylinder 10 and the tube 12 constitutes a liquid reservoir designated as $c$. As will be understood, the chambers $a$ and $b$ are filled with liquid and some additional liquid is contained in the reservoir $c$.

Between the main body element 15 and the valve seat element 16 of the head 14 is a space 21 which is in communication with the reservoir $c$, while extending through said valve seat element is a central port 22 and a plurality of surrounding ports 23 which afford communication between the chamber $b$ and said space 21 under the control of a metering pin 24 and a check-valve ring 25, respectively.

The port 22 is constricted intermediate its ends to afford a valve seat 26. The metering pin 24 extends through said port and, outwardly of said valve seat, is formed with a valve portion 27 to close inwardly against said seat and to open outwardly relative thereto. On the other hand, the check valve ring 25 is disposed inwardly of the valve seat element 16 for outward movement to close and for inward movement to open the ports 23. Between a suitable abutment on the inner end portion of the metering pin 24 and the check valve ring 25 is interposed a spring 28 which tends constantly to urge said check valve ring outwardly to close the ports 23 and to urge said metering pin inwardly to close the port 22.

In the stem 20 is a bore 29 in the inner end portion of which the outer end portion of the metering pin 24 is slidably disposed, while formed as an enlargement of the inner end portion of said bore is a well 30 which opens at its inner end into the space 21 and in which is disposed a piston element 31 formed as an annular flange projecting from the metering pin 24, whereby a dash-pot is provided to resist outward movement of said metering pin. Between the edge of the flange 31 and the wall defining the side of the well 30 is a small clearance space 32 for escape of liquid from said well to the space 21 to permit outward movement of the metering pin 24 under the influence of liquid pressure exerted against its inner end.

In the metering pin 24 is an axial bore 33 and two lateral ports 34 and 35, the former of which is located inwardly of the valve seat 26 to afford constant communication between the chamber $b$ and said bore 33 and the latter of which is located to afford communication between said bore 33 and the well 30 outwardly of the piston element 31 under the control of a plunger pin 36.

The bore 33 opens through the outer end portion of the metering pin 24 and the plunger pin 36 is slidable in the outer end portion of said bore. On said plunger pin is an annular flange 37 and interposed between this flange and a plug 38 threaded in the bore 29 of the stem 20 is a coil spring 39 which tends constantly to urge said plunger pin to its innermost position relative to the metering pin 24 as determined by seating of the flange 37 against the outer end of said metering pin. The plunger 36 is of a length such that it covers the port 35 when it is in its innermost position relative to the metering pin 24, but begins to uncover said port substantially immediately upon outward movement thereof relative to said metering pin. In this connection, the inner end portion of said pin 36 may be tapered as shown to permit progressively increasing flow of liquid from the bore 33 through the port 35 as said pin is moved outwardly relative to the metering pin 24. Alternatively, the port 35 may be of increasing area outwardly to obtain this same effect, regardless of whether the inner end portion of the pin 36 is or is not tapered. In any event, movement of said pin 36 to its innermost position relative to the metering pin 24 is effective to close the port 35 and thus deny communication between the bore 33 and the well 30, while outward movement of said pin 36, relative to said metering pin 24, is effective to uncover said port 35 and thus subject the outer side of the piston element 31 to whatever liquid pressure may be generated in the chamber $c$ by movement of the piston 11 toward the cylinder head 14.

In accordance with the invention the piston 11 is provided with suitable means for controlled flow of liquid therethrough between the chambers $a$ and $b$. Such means may be of the type illustrated and described in my aforesaid patent or in my aforesaid application or of any other suitable type. It is not shown because the present invention is not concerned with the control afforded thereby. Suffice it to say that as the piston 11 moves toward the head 13, controlled flow of liquid occurs through said piston from the chamber $a$ to the chamber $b$ and thereby the shock absorber is caused to resist and absorb the force or shock which produced movement of the piston 11 toward the head 13. At the same time, the valve 25 is drawn open and enough liquid is drawn from the reservoir $c$ through the ports 23 into the chamber $b$ to maintain said chamber filled with liquid, such drawing of liquid from the reservoir $c$ into the chamber $b$ being due to the fact that a lesser amount of liquid is displaced from the chamber $a$.

Suffice it to say, too, that as the piston 11 moves toward the head 12 as a result of a compression load or shock imposed upon the shock absorber, liquid is displaced from the chamber $b$ and flows through said piston into the chamber $a$. Since, however, because of the presence of the piston rod 19 in the chamber $a$, said chamber $a$ cannot accommodate all of the liquid that is displaced from the chamber $b$, the excess liquid is compelled to pass through either the port 22 or the bore 33 of the metering pin 24, or through both said port and said bore, to the reservoir $c$.

Before movement of the piston 11 toward the head 14 begins, the pressure in the chamber $b$ is zero. When, however, the piston 11 is moved toward the head 14, pressure is generated in the chamber $b$ and this pressure, acting against the inner end of the metering pin 24, urges said pin outwardly to open the port 22 and thus permit escape of liquid from said chamber $b$ through said port to the reservoir $c$ to relieve the pressure. In the case of small loads the pressure generated may not be sufficient to impart any outward movement to the plunger pin 36 but in the case of larger loads the pressure of the liquid against the inner end of the plunger pin 36 moves said plunger pin outwardly relative to the metering pin 24 and thereby uncovers the port 35 with the result that escape of some of the liquid into the dash-pot well 30 outwardly of the piston element 31 is permitted In this connection, the strength of spring 28, the area of the space 32 for escape of liquid from the dash-pot well 30, and the strength of the spring 39, are such that if the load imposed upon the shock absorber and the pressure generated are normal, the plunger pin 36 is moved only a small amount outwardly relative to the metering pin 24 and there is admitted to the well 30 only such a small volume of liquid at such low velocity that it may readily escape from said well through the space 32 and therefore will not act seriously in a differential manner against the outer side of the piston element 31 to resist outward movement of the metering pin 24, while said metering pin will be moved outwardly an amount to permit escape of just the required amount of liquid to cause the shock absorber smoothly and evenly to absorb the load or shock imposed thereon.

If the load or shock imposed upon the shock absorber should be abnormal, the shock absorber initially will function as just described. However, with rise in the pressure of the liquid as the load or shock increases, the plunger pin 36 will be moved farther outward relative to the metering pin 24 and permit increased flow of liquid into the dash-pot well 30. This increased flow will cause a choking of the clearance space 32 and a rise in the pressure acting inwardly upon the metering pin 24 relative to the pressure acting outwardly thereagainst with the result that said metering pin will be urged inwardly and will decrease the effective area of the port 22. Hence, there will occur a progressive rise in the resistance of the shock absorber to the abnormal load imposed thereon and such load will be smoothly and evenly absorbed as in the case of a normal load or shock. In other words, the present construction consistently affords the desired "bottoming" control desired in an ideally, resiliently suspended vehicle body, gun carriage or the like, for even if an exceptionally sever, suddenly applied shock should result in complete closure of the port 22 by inward movement of the metering pin 24, liquid still would be able to escape via the port 35 and no locking or solid action of the shock absorber could result. Consequently, there is eliminated any necessity of a pop-off valve such, for example, as the pop-off valves of my prior patent and application. Moreover, since the dash-pot well 30 is charged by the very action which is to be controlled, there never can be a loss of instantaneous control regardless of speed of action.

As increased compression loads imposed upon the shock absorber produce increased velocities in the shock absorber liquid, this might mean, in the case of abnormal compression loads imposed upon the shock absorber, such rapid outward movement of the plunger pin 36 and such consequent rapid flow of liquid into the well 30, with such consequent inward movement of the metering pin 24, as to cause the increase in resistance to compression of the shock absorber to exceed the desired value, were it not for the fact that the plunger pin 36 is itself dash potted to cause the by-pass flow into the well 30 to be more or less of a constant volume value.

In this connection it is pointed out that the flange 37 of the plunger pin 36 is of suitably lesser diameter than the bore 29 and, by reason of operating in said bore, serves to provide a dash pot to control outward movement of said plunger pin. Thus, regardless of the pressure and the velocity of the liquid, outward movement of said plunger pin is retarded to as to avoid such rapid inward movement of the metering pin 24 as to cause the compression resistance of the shock absorber to exceed the desired value. It is further pointed out that there is a suitable clearance space 24' between the outer end portion of the metering pin 24 and the wall defining the bore 29 for flow of liquid between said bore, outwardly of the outer end of said metering pin, and the well 30, whereby liquid displaced by the dash pot flange or piston 37 of the plunger pin 36 during outward movement of said plunger pin, may enter the well 30 and be metered therefrom through the clearance space 32.

The plug 38 is adjustable in the bore 29 to vary the effective strength of the spring 39 and thus adapt the shock absorber for most efficient use in different installations.

From the foregoing description considered in connection with the accompanying drawing it is believed that the features comprising the invention will be fully understoood and their advantages appreciated. It is desired to point out, however, that while only a single specific structural embodiment of the invention has been illustrated and described, the same readily is capable of specifically different structural embodiments within its spirit and scope as defined in the appended claims.

I claim:

1. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said pin having a bore extending longitudinally thereof, said bore opening through the outer end of said pin and being in constant communication with said end of said cylinder, said head having a well and said pin having a piston portion disposed in said well to provide a dash-pot to resist outward movement of said pin, said pin having a side opening affording communication between said bore and said well outwardly of said piston portion, a plunger pin slidable in said bore, and yieldable means tending constantly to urge said plunger pin inwardly to a position closing the side opening in said metering pin, said plunger pin being movable outwardly by pressure of liquid against its inner end to open said side opening and thus admit liquid to said well to urge said metering pin inwardly.

2. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said head having a well and said pin having a piston portion disposed in said well to provide a dash-pot to resist outward movement of said pin, and means including a yieldably closed valve openable by the pressure of the liquid to admit a portion of the liquid to said well outwardly of the piston portion of said pin to urge said pin inwardly.

3. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said head having a well and said pin having a piston portion disposed in said well to provide a dash-pot to resist outward movement of said pin, and means affording communication through said pin between said end of said cylinder and said well outwardly of the piston portion of said pin, said means including a yieldably closed valve openable by the pressure of the liquid to admit a portion of the liquid to said well to urge said pin inwardly.

4. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said pin having a bore extending longitudinally thereof, said bore opening through the outer end of said pin and being in constant communication with said end of said cylinder, said head having a well and said pin having a piston portion disposed in said well to provide a dash-pot to resist outward movement of said pin, said pin having a side opening affording communication between said bore and said well outwardly of said piston portion, a plunger pin slidable in said bore, yieldable means tending constantly to urge said plunger pin inwardly to a position closing the side opening in said metering pin, said plunger pin being movable outwardly by pressure of liquid against its inner end to open said side opening and thus admit liquid to said well to urge said metering pin inwardly, and dash-pot means controlling outward movement of said plunger pin.

5. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjecting to liquid pressure to urge said pin outwardly and thus open said port, said head having a well and said pin having a piston portion disposed in said well to provide a dash-pot to resist outward movement of said pin, means including a yieldably closed valve openable by the pressure of the liquid to admit a portion of the liquid to said well outwardly of the piston portion of said pin to urge said pin inwardly, and dash-pot means controlling opening movement of said valve.

6. In a hydraulic shock absorber, a cylinder, a piston reciprocable therein, a liquid reservoir, a head closing one end of said cylinder and having therein a port affording communication between said end of said cylinder and said reservoir, a metering pin extending through said port and inwardly movable to close and outwardly movable to open the same, yieldable means tending constantly to urge said pin inwardly to a port-closing position, the inner end of said pin being exposed within the said end of said cylinder for subjection to liquid pressure to urge said pin outwardly and thus open said port, said pin having a bore extending longitudinally thereof, said bore opening through the outer end of said pin and being in constant communication with said end of said cylinder, said head having a well and said pin having a piston portion disposed in said well to provide a dash-pot to resist outward movement of said pin, said pin having a side opening affording communication between said bore and said well outwardly of said well outwardly of said piston portion, a plunger pin slidable in said bore, yieldable means tending constantly to urge said plunger pin inwardly to a position closing the said opening in said metering pin, said plunger pin being movable outwardly by pressure of liquid against its inner end to open said side opening and thus admit liquid to said well to urge said metering pin inwardly, the piston portion of said metering pin having clearance from the wall defining the side of said well for metered escape from said well of liquid displaced therefrom by outward movement of said piston portion, said head having a bore and said plunger pin having a piston portion operating in said bore to afford a dash-pot to control outward movement of said plunger pin, and means for flow into said well of liquid displaced from said bore by said plunger pin piston portion.

NEVIN S. FOCHT.